(12) United States Patent
Park et al.

(10) Patent No.: US 7,894,632 B2
(45) Date of Patent: Feb. 22, 2011

(54) APPARATUS AND METHOD OF ESTIMATING CENTER LINE OF INTERSECTION

(75) Inventors: Jeong-Ho Park, Daejeon (KR); Seong Ik Cho, Daejeon (KR); Gee Ju Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 824 days.

(21) Appl. No.: 11/858,181

(22) Filed: Sep. 20, 2007

(65) Prior Publication Data

US 2008/0123902 A1 May 29, 2008

(30) Foreign Application Priority Data

Nov. 27, 2006 (KR) ...................... 10-2006-0117939

(51) Int. Cl.
*G06K 9/00* (2006.01)
(52) U.S. Cl. ...................................... 382/104; 382/106
(58) Field of Classification Search ................. 382/104
See application file for complete search history.

(56) References Cited

U.S. PATENT DOCUMENTS

| | | | | |
|---|---|---|---|---|
| 6,035,053 | A * | 3/2000 | Yoshioka et al. | 382/104 |
| 6,191,704 | B1 * | 2/2001 | Takenaga et al. | 340/903 |
| 6,546,119 | B2 * | 4/2003 | Ciolli et al. | 382/104 |
| 6,625,315 | B2 | 9/2003 | Laumeyer et al. | |
| 7,362,241 | B2 * | 4/2008 | Kubota et al. | 340/995.1 |
| 7,362,883 | B2 * | 4/2008 | Otsuka et al. | 382/104 |
| 2002/0141618 | A1 * | 10/2002 | Ciolli et al. | 382/104 |
| 2004/0252193 | A1 * | 12/2004 | Higgins | 348/149 |
| 2008/0004761 | A1 * | 1/2008 | Yamada | 701/25 |
| 2008/0123902 | A1 * | 5/2008 | Park et al. | 382/104 |
| 2009/0058678 | A1 * | 3/2009 | Matsuoka et al. | 340/904 |
| 2009/0303077 | A1 * | 12/2009 | Onome et al. | 340/901 |

FOREIGN PATENT DOCUMENTS

JP      06-034369      2/1994

(Continued)

OTHER PUBLICATIONS

Korea Notice of Patent Grant dated Feb. 5, 2008 for the corresponding application KR10-2006-0117939.

*Primary Examiner*—Sath V Perungavoor
(74) *Attorney, Agent, or Firm*—Ladas & Parry LLP

(57) ABSTRACT

Provided are a method and apparatus for estimating a center line of an intersection by recognizing a crosswalk on a road input through a camera installed in a vehicle. The apparatus includes a road information providing unit which provides information about a road being traveled based on location information of a traveling vehicle; a crosswalk recognizing unit which recognizes a crosswalk based on an input image of the intersection and the information about the road and obtains a distance from the traveling vehicle to the crosswalk; and an intersection center line estimating unit which estimates the center line of the intersection based on the information about the road and the distance from the traveling vehicle to the crosswalk. Since the center line of the intersection is estimated, the apparatus and method of estimating a center line of an intersection according to the present invention can prevent traffic accidents occurring frequently at an intersection and helps indicate direction information of 'real vehicle navigation.'

8 Claims, 4 Drawing Sheets

FOREIGN PATENT DOCUMENTS

| | | |
|---|---|---|
| JP | 06-068391 | 3/1994 |
| JP | 2004-265432 | 9/2004 |
| KR | 19980001160 | 3/1998 |
| KR | 1020010020917 | 3/2001 |
| KR | 100587405 | 5/2006 |
| KR | 1020060061556 | 6/2006 |

* cited by examiner

APPARATUS AND METHOD OF ESTIMATING CENTER LINE OF INTERSECTION

CROSS-REFERENCE TO RELATED PATENT APPLICATION

This application claims the benefit of Korean Patent Application No. 10-2006-0117939, filed on Nov. 27, 2006, in the Korean Intellectual Property Office, the disclosure of which is incorporated herein in its entirety by reference.

BACKGROUND OF THE INVENTION

1. Field of the Invention

The present invention relates to a method and apparatus for estimating a center line of an intersection, and more particularly, to a method and apparatus for estimating a center line of an intersection by recognizing a crosswalk, which is indicated by road markings.

2. Description of the Related Art

A method of recognizing an intersection can be divided into two types; a hardware based recognizing method by using a sensor and a computer vision based software method.

Firstly, the sensor based method transmits information to vehicles passing through an intersection by having a sensor capable of communicating at the intersection. In such a method, accurate information can be provided, however, installation fees are high.

Secondly, the computer vision based method recognizes important road facilities from a road image by using cameras that are generally installed in vehicles with respect to a current technology related to vehicles' safe operation. In such a method, costs are relatively low; however, the cameras are sensitive to the surroundings.

In order to recognize an intersection, an existing method to recognize a stop line to inform a driver about an approaching intersection so as to induce the driver to drive safely is introduced. However, since the stop line is a single line, if another vehicle stops on the side of the road or around the stop line, a probability of recognition failure is high.

In addition, an conventional method of recognizing a crosswalk is used in order to identify the location of the crosswalk for guiding the blind, instead of using a camera installed in a vehicle.

SUMMARY OF THE INVENTION

The present invention provides a method and apparatus for estimating a center line of an intersection by recognizing a crosswalk having a regular pattern and clear characteristics so that a probability of recognition failure is reduced, in order to solve problems of an existing computer vision based software method.

According to an aspect of the present invention, there is provided an apparatus for estimating a center line of an intersection, the apparatus including: a road information providing unit which provides information about a road being traveled based on location information of a traveling vehicle; a crosswalk recognizing unit which recognizes a crosswalk based on an input image of the intersection and the information about the road and obtains a distance from the traveling vehicle to the crosswalk; and an intersection center line estimating unit which estimates the center line of the intersection based on the information about the road and the distance from the traveling vehicle to the crosswalk.

According to another aspect of the present invention, there is provided a method of estimating a center line of an intersection, the method including: obtaining information about a road being traveled based on location information of a traveling vehicle; recognizing a crosswalk based on an input image of the intersection and the information about the road; obtaining a distance from the traveling vehicle to the crosswalk; and estimating the center line of the intersection based on the information about the road and the distance from the traveling vehicle to the crosswalk.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
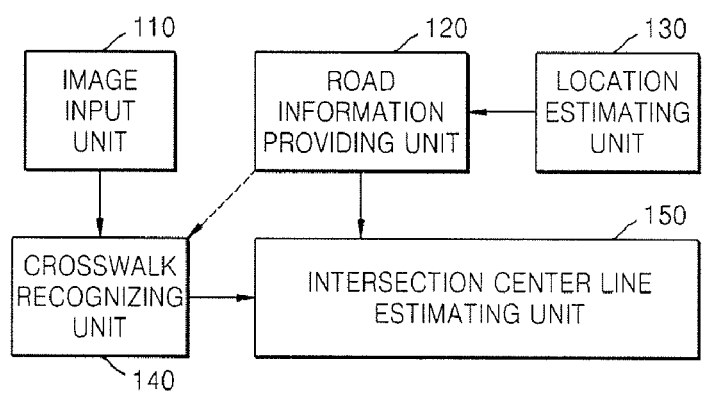
FIG. 1 is a block diagram of an apparatus for estimating a center line of an intersection by recognizing a crosswalk according to an embodiment of the present invention.

FIG. 1 is a block diagram of an apparatus for estimating a center line of an intersection by crosswalk recognition according to an embodiment of the present invention.

The apparatus for estimating a center line of an intersection by crosswalk recognition includes an image input unit 110 and a location estimating unit 130, wherein the image input unit 110 receives an image of an intersection that means the same as road images at the intersection in real-time through a camera installed in front of a vehicle and the location estimating unit 130 determines location information of vehicles by using, for example, Global Positioning System (GPS).

The image input unit 110 sequentially receives road images at an intersection in real-time in the form of uniform image frames.

A road information providing unit 120 searches for information on a road currently being traveled, from pre-stored database, based on current location information on a vehicle obtained from the location estimating unit 130 and transmits the information to a crosswalk recognizing unit 140 and an intersection center line estimating unit 150.

The information transmitted to the crosswalk recognizing unit 140 and the intersection center line estimating unit 150 by the road information providing unit 120 is 2D map information regarding the width and number of lanes of the road currently being traveled, the width and form of an intersection, and the width of a crosswalk.

The crosswalk recognizing unit 140 extracts regions of interest from image frames input to the image input unit 110 in real-time and recognizes characteristics of a crosswalk so as to transmit the information to the intersection center line estimating unit 150.

The intersection center line estimating unit 150 represents a center line of an intersection on the 2D map information image provided by the road information providing unit 120 based on information transmitted from the road information providing unit 120 and the crosswalk recognizing unit 140.

Figure 2:
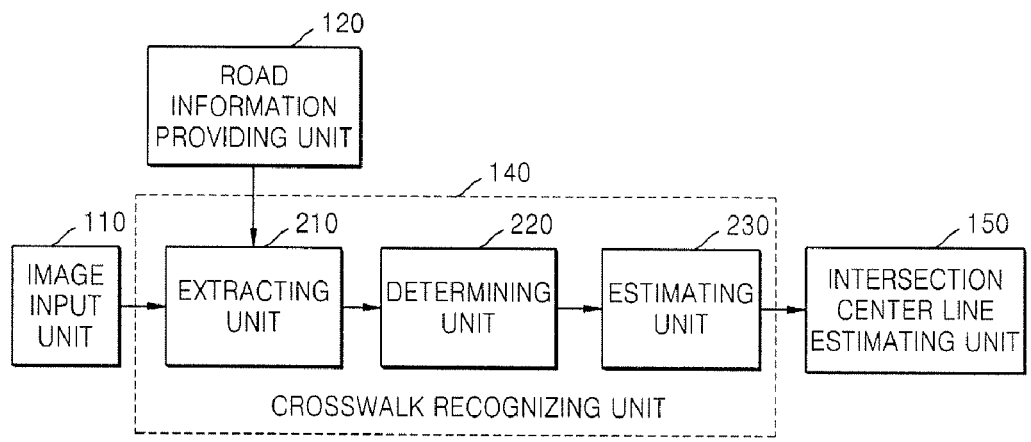
FIG. 2 is a block diagram of a crosswalk recognizing unit according to an embodiment of the present invention.

FIG. 2 is a block diagram of the crosswalk recognizing unit 140 according to an embodiment of the present invention.

The crosswalk recognizing unit 140 includes an extracting unit 210, a determining unit 220, and an estimating unit 230, wherein the extracting unit 210 enlarges and extracts images in the regions of interest estimated as a crosswalk based on the information provided by the road information providing unit 120 and the intersection image input from the image input unit 110, the determining unit 220 examines pixel change of each cell boundary and a boundary of upper and lower parts which is property of a crosswalk in the extracted image with a predetermined condition and recognizes the crosswalk, and the estimating unit 230 estimates the distance from a vehicle traveling a road to a crosswalk.

Figure 3:
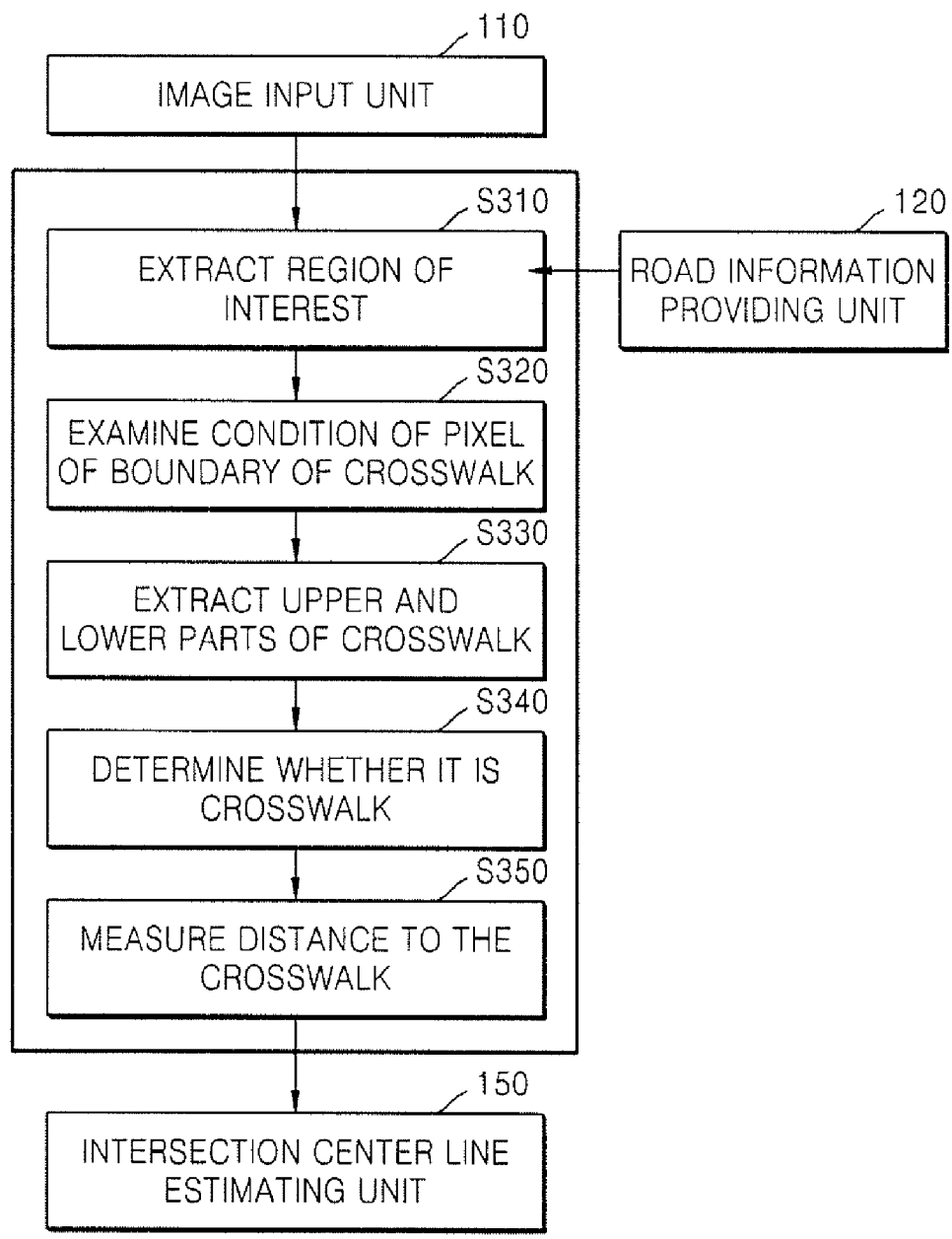
FIG. 3 is a flowchart of a process of recognizing a crosswalk, performed in a crosswalk recognizing unit, according to an embodiment of the present invention.

FIG. 3 is a flowchart of a process of recognizing a crosswalk, performed in the crosswalk recognizing unit 140, according to an embodiment of the present invention.

In operation 310, a region of interest among the images input in real-time from the image input unit 110 is only extracted and a crosswalk is recognized from such a region. The extraction of the region of interest can increase a recognition processing speed.

A crosswalk substantially has a regular rectangular form. However, in a view from the eye level of a driver, boundaries of each small cell forming of a crosswalk are shown from each different angle.

Therefore in operation 320, a examination with respect to pixels of each cell boundary, which are properties of the crosswalk, is performed with the predetermined condition. In this examination, changes of an edge mark and an angle of an edge shown to the driver may be examined.

Once such property of the crosswalk satisfies the predetermined condition, the crosswalk is included in a crosswalk candidate.

However, since such a property may be found in other signs on the road surface, in operation 330, whether such a property is shown on the whole road is checked by detecting the upper and lower part of the crosswalk.

The results of operations 320 and 330 are considered together and whether a crosswalk exists is finally determined in operation 340.

When it is determined that there is a crosswalk, the distance to the crosswalk is measured in operation 350 and the measuring result is sent to the intersection center line estimating unit 150.

The distance to the crosswalk can be measured by a calibration parameter of a camera used in the image input unit 110 and such a method is known to those of ordinary skill in the art.

Figure 4:
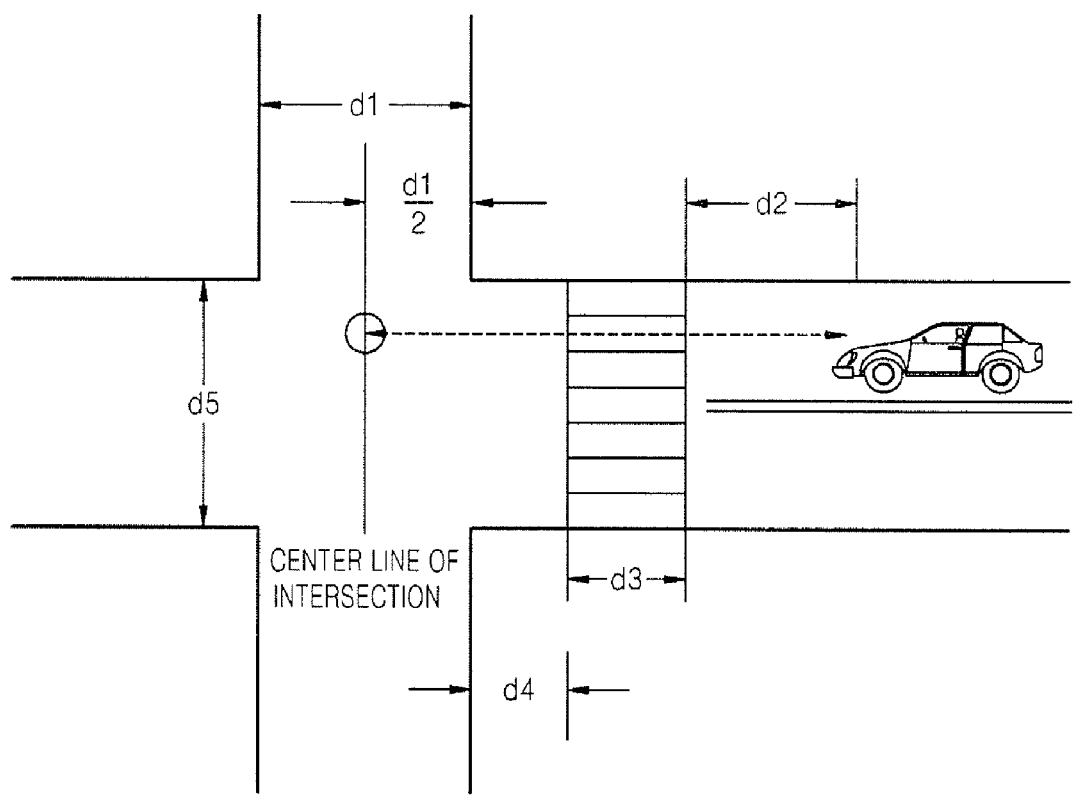
FIG. 4 is a diagram of an example of estimating a center line of an intersection based on crosswalk recognition according to an embodiment of the present invention.

FIG. 4 is a diagram of an example of estimating a center line of an intersection based on crosswalk recognition according to an embodiment of the present invention.

Referring to FIG. 4, d1 is the width of the road located in the left and right of the intersection with reference to a traveling vehicle, d2 is the distance between the crosswalk and the traveling vehicle, d3 is the width of the crosswalk, d4 is the distance between the crosswalk and the starting point of the intersection, and the center line of the intersection is shown at a distance d1;2 from the starting point of the intersection.

Thus, the distance from the vehicle to the center line of the intersection is d1;2+d2+d3+d4.

Here, d1 and d3 can be obtained from the road information providing unit 120 and d2 can be obtained from the crosswalk recognizing unit 140.

d4 is not a defined value, but it does, however, comply with the following rule. It is defined that in a road having a two-lane one way or less, d4=d3;3, in a road having two-lane to four-lane one way, d4=d3;2, and in a road having a four-lane one way or more, d4=d3.

Thus, the center line of the intersection can be estimated on a 2D image obtained in the image input unit 110 based on data provided by the road information providing unit 120 and the crosswalk recognizing unit 140.

Figure 5:
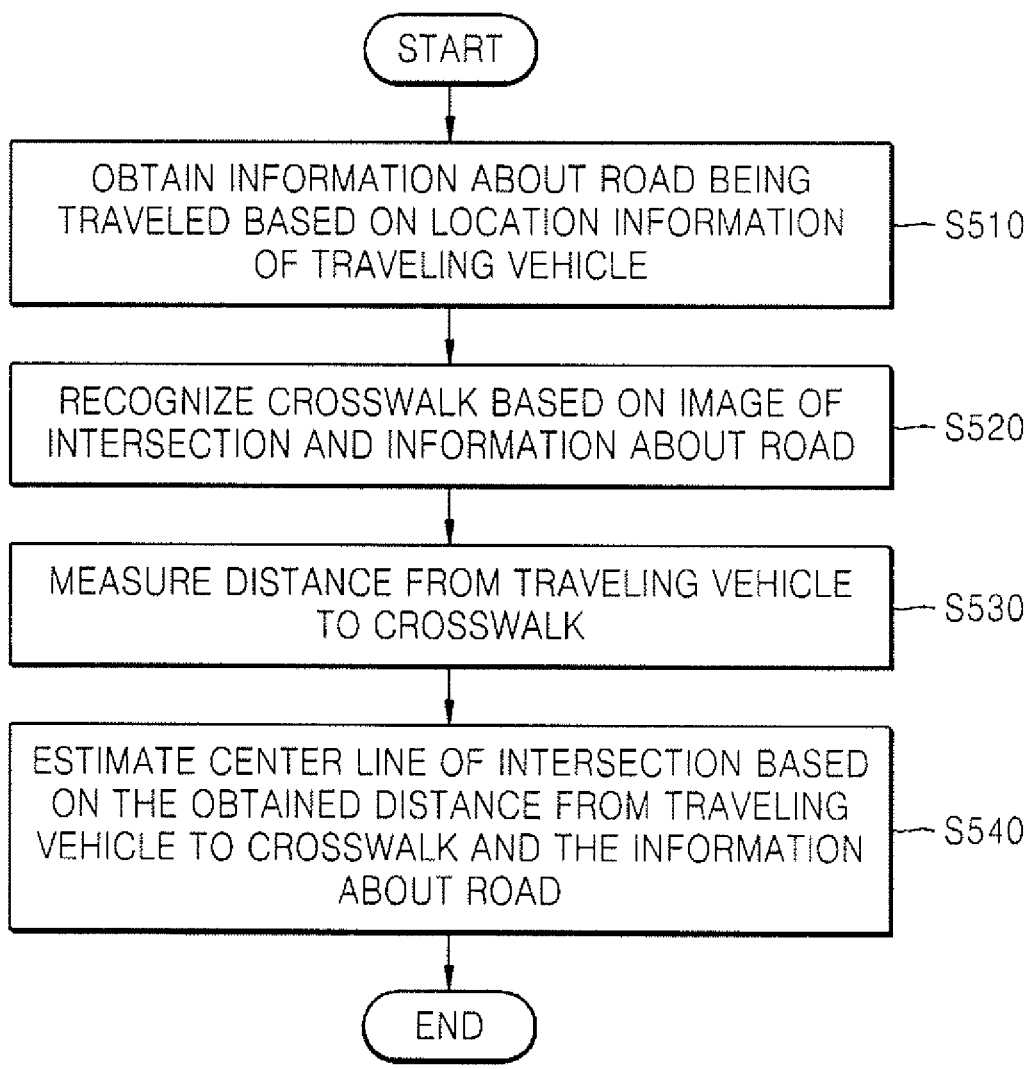
FIG. 5 is a flowchart of a process of estimating a center line of an intersection according to an embodiment of the present invention.

FIG. 5 is a flowchart of a process of estimating a center line of an intersection according to an embodiment of the present invention.

Information of the road being traveled is obtained based on location information of the traveling vehicle in operation 510.

The location information of the traveling vehicle is provided from the location estimating unit 130 and the information of the road being traveled includes the width and number of lanes of the road being traveled, the width and form of the intersection, and the width of the crosswalk.

The crosswalk is recognized based on the real-time image of the intersection input from the image input unit 110 and the road information input from the road information providing unit 120 in operation 520.

The distance from the traveling vehicle to the crosswalk is obtained in operation 530.

The center line of the intersection is estimated based on the obtained road information and the distance from the traveling vehicle to the crosswalk in operation 540.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, the apparatus and method of estimating a center line of an intersection according to the present invention can prevent traffic accidents occurring frequently at an intersection and helps indicate direction information of 'real vehicle navigation'. That is, in the case of the 'real vehicle navigation', when a change in direction is needed at the intersection, a direction is indicated on a real image by using an augmented reality (AR) technology. However, if the center line of the intersection is not clear, a driver may be confused. In this case, the apparatus for estimating the center line of the intersection according to the present invention may be effective in this regard.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for estimating a center line of an intersection, the apparatus comprising:

a road information providing unit which provides information about a road being traveled based on location information of a traveling vehicle;

a crosswalk recognizing unit which recognizes a crosswalk based on an input image of the intersection and the information about the road and obtains a distance from the traveling vehicle to the crosswalk; and an intersection center line estimating unit which estimates the center line of the intersection based on the information about the road and the distance from the traveling vehicle to the crosswalk.

2. The apparatus of claim 1, further comprising an image input unit which obtains an image of the intersection in real-time, wherein the crosswalk recognizing unit comprises:

an extracting unit which extracts an image of the crosswalk based on the obtained image of the intersection and the information about the road;

a determining unit which recognizes the crosswalk based on pixel change of a boundary of the crosswalk; and an estimating unit which estimates the distance from the traveling vehicle to the crosswalk.

3. The apparatus of claim 1, wherein the road information providing unit comprises a location estimating unit which obtains location information of the traveling vehicle.

4. The apparatus of claim 1, wherein the information about the road provided from the road information providing unit comprises a width and number of lanes of the road being traveled, a width and form of the intersection, and a width of the crosswalk.

5. A method of estimating a center line of an intersection, the method comprising:

obtaining information about a road being traveled based on location information of a traveling vehicle;

recognizing a crosswalk based on an input image of the intersection and the information about the road;

obtaining a distance from the traveling vehicle to the crosswalk; and estimating the center line of the intersection based on the information about the road and the distance from the traveling vehicle to the crosswalk.

6. The method of claim 5, wherein in the recognizing of the crosswalk, the crosswalk is recognized based on pixel change of a boundary of the crosswalk.

7. The method of claim 5, wherein in the information about the road comprises a number of lanes of the road being traveled, a width and form of the intersection, and a width of the crosswalk.

8. A non-transitory computer readable medium having embodied thereon a computer program for executing the method of any one of claims 5 through 7.

* * * * *